United States Patent [19]

O'Malley et al.

[11] Patent Number: 4,857,884
[45] Date of Patent: Aug. 15, 1989

[54] PAGING SYSTEM

[75] Inventors: Michael T. O'Malley, Carp; Robert G. Johnston, Nepean, both of Canada

[73] Assignee: Newbridge Networks Corp., Ontario, Canada

[21] Appl. No.: 143,115

[22] Filed: Jan. 12, 1988

[30] Foreign Application Priority Data

Jul. 10, 1987 [CA] Canada ................................. 541760

[51] Int. Cl.⁴ .......................................... H04M 11/02
[52] U.S. Cl. ............................. 340/311.1; 340/310 R
[58] Field of Search ............ 340/311.1, 310 R, 310 A, 340/333, 825.44, 825.47; 320/10, 11, 14, 39, 40

[56] References Cited

U.S. PATENT DOCUMENTS 4,223,232  9/1980  Bulat ............................... 340/333 X
4,348,657  9/1982  Merkel ............................ 340/310 R
4,544,910 10/1985  Hoberman ...................... 340/333

Primary Examiner—Joseph A. Orsino
Assistant Examiner—Brian R. Tumm
Attorney, Agent, or Firm—Antonelli, Terry & Wands

[57] ABSTRACT

A paging system in which a large number of paging amplifiers may be connected to a pair of signal and power carrying wires having insufficient capacity to carry operating power for the amplifiers. Each of the amplifiers has a local chargeable battery connected to receive charging current from the pair of wires and for operating the associated paging amplifier. Charging power is applied to the pair of wires for charging the batteries during intervals when no paging signal is being carried by the wires. The presence or absence of charging power is detected and the paging amplifiers disabled or enabled respectively in response.

11 Claims, 3 Drawing Sheets

PAGING SYSTEM

FIELD OF THE INVENTION

This invention relates to a paging system and particularly to one in which a large number of paging amplifiers may be connected to a pair of signal and power carrying wires having insufficient capacity to carry operating power for the amplifiers.

BACKGROUND OF THE INVENTION

Paging amplifiers are often connected to a PABX or other system signal source wherein a large number of amplifiers are driven in common with announcement, music, etc. signals. Such amplifiers may be built into wall boxes or may be packaged with or drive speakers attached to walls or within ceilings.

While the problem of driving the amplifiers by a common signal has long been satisfactorily solved, the problem of powering the amplifiers has not. The paging amplifiers are typically powered from a secure paging system main power supply, in order that emergency announcements would not be disrupted in the case of a utility power failure.

The paging amplifiers are sometimes powered via a common 70 volt line. However such a line has exhibited induction problems if it were placed too close to telephone lines which very often are run parallel to the paging line.

In order to substantially eliminate the induction problem, local paging amplifiers are sometimes connected in phantom with telephone lines. However the telephone wires are only narrow gauge (e.g. #22 wire), and therefore only a limited number of paging amplifiers could be used, driven from a limited length of line since voltage drop in the telephone wires limits the amount of current that can be provided to the paging amplifiers. Therefore a separate pair of heavy gauge wires is often separately run to carry power to each of the paging amplifiers. Typically a pair of relatively heavy gauge, e.g. #18 gauge power wires would extend to each paging amplifier, as well as relatively light #22 gauge telephone wires carrying the paging signal. This type of system could accommodate a large number, e.g. hundreds, of paging amplifiers without the induction problems of the 70 volt line, but suffers from the high installation and wire cost of the extra heavy gauge pair of wires.

SUMMARY OF THE INVENTION

In the present invention a large number of paging amplifiers, e.g. hundreds, can be connected to a light gauge pair of paging signal carrying wires, e.g. common #22 gauge telephone wires, without the requirement for each to be connected to the mains power. A separate pair of heavy gauge power carrying wires is not required. As a result a spare pair of telephone wires which often is found pre-installed to accommodate telephone communication can be used, and no additional installation cost need be incurred. A 70 volt line is not used; no induction problem has been perceived.

The present invention utilizes paging amplifiers each having a chargeable battery having capacity sufficient to power the associated amplifier. The amplifier is connected to the pair of light gauge wires carrying the signal. During the time that no paging signal is carried by the pair of wires, a charging current is applied from a common current source to the wires. The amount of charging current received at each amplifier is normally less than that required to power the amplifier. This current is applied to all batteries and continuously charges them. Since the current carried by the pair of wires is kept small, the voltage drop in the pair of wires is small.

A circuit at each amplifier senses that charging voltage (or current associated therewith) is being carried by the wires, and applies a voltage to a disable terminal of the active portion of the paging amplifier, causing it to be inhibited and not to draw operating current from the battery. As a result the current received at the amplifier is used to charge the battery.

When a paging signal is applied to the pair of wires, a circuit at the power supply location reduces the charging voltage and current to virtually zero. The paging signal is applied instead to the pair of wires. The circuit at each local paging amplifier senses that the charge voltage or current is no longer present, and as a result enables the active portion of the paging amplifier. The paging amplifier reverts to being powered from its local battery, and amplifies the paging signal received from the remote transmitting unit.

Since the duty cycle of the paging amplifier is typically low, it has been found that there is sufficient time to maintain the paging batteries sufficiently charged to power the paging amplifiers for virtually all announcements.

While the description of a preferred embodiment below is directed to a paging system, it will be clear that the concepts involved could be equally applied to any other system comprising a plurality of remote units which are to be driven and powered from a central unit, and which must be connected to the signal driving source via light gauge wires which have insufficient capacity to carry power for all of the remote units.

BRIEF DESCRIPTION OF THE DRAWINGS

A better understanding of the invention may be obtained by reference to the detailed description below of the preferred embodiment, in conjunction with the following drawings, in which.

DESCRIPTION OF THE PREFERRED EMBODIMENTS OF THE INVENTION

Figure 1:
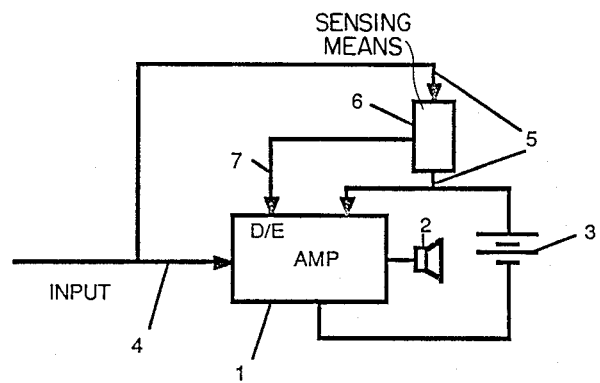
FIG. 1 is a block diagram depicting a paging receiver.
Figure 2:
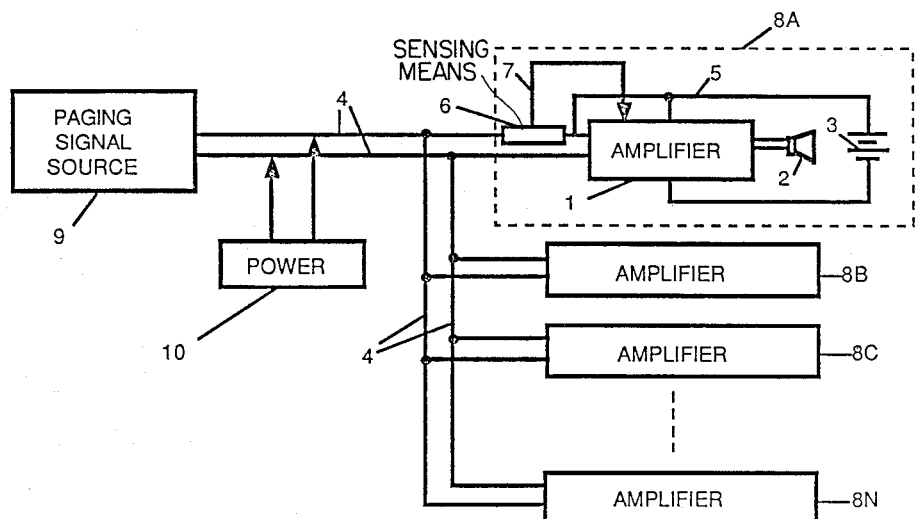
FIG. 2 is a general block diagram depicting a paging system.

Turning to FIGS. 1 and 2, a paging amplifier active unit 1 is shown, to which a paging loudspeaker 2 is connected in a conventional manner. A local battery 3 is connected to the active unit for supplying operating power. A pair of wires 4 are connected to the input of the amplifier 1. A lead 5 which is connected to the wires 4 provides a circuit path for charging the battery 3.

A sensing means 6 senses the presence of charging current or voltage carried by wires 4 and applies a disable voltage 2 to a disable/enable D/E terminal of amplifier 1.

As shown in FIG. 2, the above-described circuit is duplicated a plurality of times as paging amplifiers 8A, 8B . . . 8N, which are connected in parallel to the pair of wires 4.

A paging signal source means 9 (such as a PABX or a public address amplifier) is connected to a remote end of the pair of wires 4, and applies a paging signal thereto which is to be amplified by each of the local paging amplifiers.

A source 10 of charging power (current and voltage) is also connected to leads 4.

In operation, charging power is applied to the pair of wires 4 at the remote location, which is carried by the narrow gauge wires to each of the paging amplifiers. At each of the paging amplifiers, the charging current charges the local rechargeable battery 3. Sensing means 6 at each amplifier senses the charging current carried by wires 4 and as a result applies a disable signal to the D/E terminal of paging amplifier 1. As a result the paging amplifier becomes disabled and silenced, and virtually no operating current is drawn through it from battery 3 or wires 4. The disabled amplifier does not amplify any noise or other signals which may be carried by the pair of wires 4.

When a paging signal is applied by signal source 9 to the pair of wires 4, the source 10 of charging power senses this and reduces the charging current and voltage to virtually zero. The sensing means 6 at each paging amplifier senses the reduced voltage or current and changes the signal applied to the D/E terminal of its associated active amplifier so as to enable the amplifier. Power from the local rechargeable battery supplies operating power and the paging signal now carried by wires 4 is as a result amplified by each local amplifier and is reproduced in the local speaker 2. When the paging signal is terminated this is sensed by the power source 10, which reapplies charging power to the pair of leads 4. This is sensed by sensing means 6 as described above which as a result applies a disable signal to the D/E terminal of its associated active paging amplifier. The charging current recharges the now partly discharged battery 3.

It should be noted that the source of charging power could be connected to the pair of wires 4 adjacent the paging signal source, adjacent any of the amplifiers, or anywhere between. Thus the source of the paging signal, can be located at a convenient place, such as within a PABX cabinet, and the source of charging current could be located at some other convenient location, such as adjacent a convenient secure power source or even adjacent a paging amplifier. However in most cases it is contemplated that the paging signal and power sources will be conveniently housed within the same cabinet.

Figure 3:
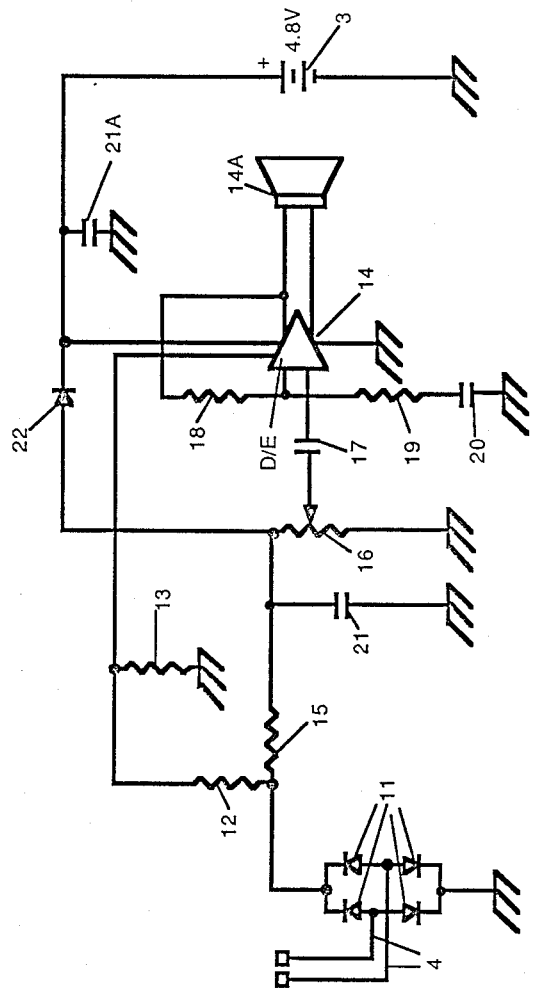
FIG. 3 is a detailed schematic diagram of a paging receiver.

Turning to the schematic diagram of the paging receiver shown in FIG. 3, the pair of wires 4 is connected to the input of a diode bridge containing four diodes 11 connected in a conventional configuration to maintain correct polarity of power applied received from wires 4. A resistor divider comprised of resistors 12 and 13 connected in series is connected across the output terminals of the diode bridge. The junction between the resistors is connected to the disable/enable D/E lead of an active amplifier 14, which can be an integrated circuit operational amplifier such as type MC34119P.

Another resistor divider comprised of resistor 15 in series with potentiometer 16 is connected across the output terminals of the diode bridge. The tap of the potentiometer 16 is AC coupled via capacitor 17 to the signal input of amplifier 14. The gain of amplifier 14 is set in a conventional manner by means of feedback resistor 18 connected from one output lead to the second input lead of amplifier 14, which second input lead is connected to ground via the series arrangement of resistor 19 and capacitor 20. Loudspeaker 14A is connected to the output leads of amplifier 14. Bypass capacitor 21 is connected across the potentiometer 16.

Rechargeable battery 3 has one terminal connected to one power input lead of amplifier 14, while the other power input lead of amplifier 14 is connected together with the other terminal of battery 3 to the other lead of the diode bridge (ground). A diode 22 is connected from the junction of resistor 15 and capacitor 16 to the first terminal of battery 3. Bypass capacitor 21A is connected between the power input leads of the amplifier 14.

During paging operation, a paging signal appears on leads 4 and passes through diode bridge 11. The signal passes through resistor 15 and potentiometer 16 and a fraction is applied via capacitor 17 to the input of amplifier 14, where it is amplified and is emitted via speaker 14A. The volume is controlled by potentiometer 16.

With battery 3, typically a 4.8 volt nickel-cadmium rechargeable battery, fully charged and its positive pole connected to the anode of diode 22, and a DC voltage up to e.g. 3.5 VDC across the pair of wires 4, from the remote power supply, diode 22 will be reverse biased. Accordingly current from the local battery will be blocked by diode 22, cannot be applied to the pair of wires 4, and passes only into amplifier 14, facilitating amplification of the input paging signal carried by wires 4.

In addition, the D.C. voltage appearing at the junction of resistors 12 and 13 will be very low, typically 16% of any voltage appearing across the output of the bridge. Since this voltage is low, and is applied to the D/E terminal of amplifier 14, amplifier 14 will be enabled. However when charging power appears on the pair of wires 4, the voltage at the junction of resistors 12 and 13 will rise. For example the charging voltage applied to the pair of wires from the remote power supply would be typically 28 volts. With 28 volts (or a slightly lower voltage caused by voltage drop due to resistance in the wires) appears across a pair of wires 4, a much higher voltage than previously appears at the junction of resistors 12 and 13. This is applied to the D/E terminal of amplifier 14, disabling it. The amplifier therefore will not amplify any signals which may appear on leads 4, and ceases drawing power from battery 3 in the manner described earlier.

It should be noted that it is intended that only a very low charge current should be carried by the pair of wires 4. Accordingly the $I^2R$ voltage drop (due to resistance) in the pair of wires 4 will be quite small, and most of the 28 volt charge voltage will appear at the amplifier.

The proportion of the DC voltage across the pair of wires 4 which appears across the potentiometer 16 should be relatively high, e.g. about 80%. This voltage which appears across diode 22 and battery 3 in series will greatly exceed the nominal voltage of battery 3. Consequently diode 22 will be forward biased, allowing charging current to pass through it and into battery 3.

The combination of resistors 12 and 13 thus forms a sensing means for determining when charging voltage or current is carried by wires. Sensing of charging voltage on wires 4 should be construed as including the sensing of charging current on wires 4, since current passing through the resistor divider is translated into voltage.

Figure 4:
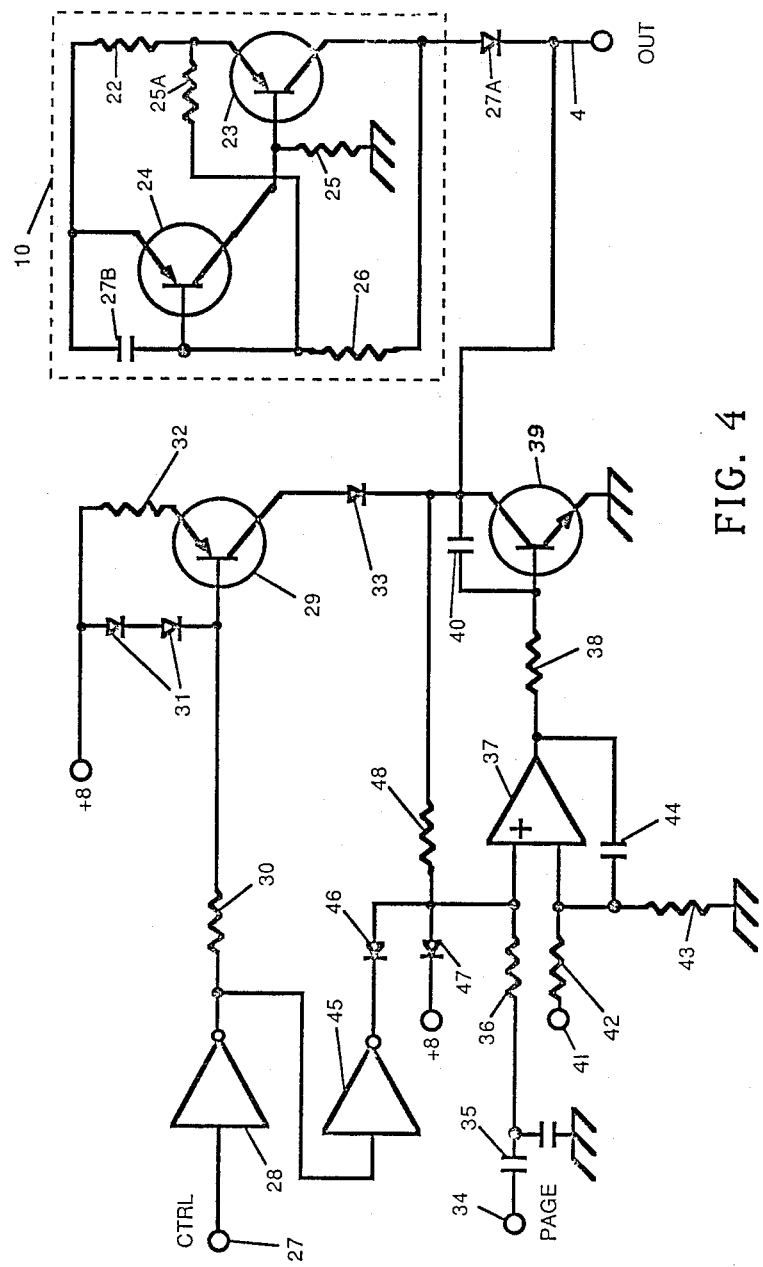
FIG. 4 is a detailed schematic diagram of paging signal and/power supply sources.

In FIG. 4 the source 10 of charging power (current and voltage) is shown. This is preferably formed of a ¼ ampere sharp current limiter of conventional configuration. In the preferred form shown the positive pole of a 28 volt DC unregulated supply is connected via resistor 22 to the emitter of a PNP transistor 23, and directly to the emitter of a PNP transistor 24. The collector of transistor 24 is connected to the base of transistor 23 and through resistor 25 to ground. The emitter of transistor 23 is connected via resistor 25A to the base of transistor 24 which itself is connected via resistor 26 to the collector of transistor 23. The collector of transistor 23 is connected to the anode of diode 27A which has its cathode connected to the first of a pair of wires 4. A small bypass capacitor 27B is connected between emitter and base of PNP transistor 24. The second of the pair of wires 4 is connected to ground.

In operation the circuit 10 forms a low impedance barrier to the +28 supply, which is connected almost directly through transistors 24 and 23 via diode 27A to the first of the pair of leads 4. If the impedance across leads 4 drops, the impedance of circuit 10 rises, dropping the voltage and current applied to the first of the pair of leads 4 so much that both are reduced to virtually zero.

Within the transmitter a "page or charge" control terminal 27 receives an external control signal which is at high level when a page signal is being generated, and low level when no page signal is being generated. This control signal is inverted in inverter 28, and is applied to the base of PNP transistor 29 through resistor 30. The base of transistor 29 is connected to a +8 volt DC supply terminal via a pair of diodes 31, and the emitter of transistor 29 is connected to the +8 volt supply terminal through resistor 32.

Transistor 29, resistor 32, and diodes 31 form a current source, supplying typically 50 milliamperes of current. The current passes from the collector of transistor 29 through isolating diode 33 to the first of the pair of wires 4. When the page or charge control terminal 27 goes high, the output of inverter 28 goes low, causing transistor 29 to become heavily forward biased, and therefore of very low impedance. This low impedance appears across the pair of wires 4. This substantially lowered impedance across the pair of wires 4 causes the impedance of the source of current 10 to rise, substantially lowering the battery charging voltage and current applied to lead 4 to virtually zero as described earlier.

When the control voltage applied to the page or charge control terminal 27 goes low, the output of inverter 28 goes high, causing transistor 29 to be biased off, thus greatly increasing its impedance and reducing substantially current flow through it. Accordingly the source of charging current 10 is allowed to relax, and its impedance reduces, allowing the +28 volts and maximum charging current to be applied to leads 4.

Clearly the page or charge control lead, which goes to high or low level upon voice actuation or the presence of a paging signal applied by external means not part of this invention causes the absence or presence of battery charging power to be applied to lead 4. Since the source of charging current 10 is in a state depending on the impedance across the wires 4, it can be located anywhere along the pair of wires and need not be situated close to the transmitter.

A paging signal, typically audio, is applied to terminal 34, which may be the paging port of a PABX. The signal is applied via capacitor 35 and resistor 36 to the non-inverting + input of operational amplifier 37, and passes from the output of amplifier 37 through resistor 38 to the base of power amplifier NPN transistor 39. The collector of transistor 39 is connected to the first of the pair of wires 4, i.e. to the cathode of diode 33 through which its operating current from the current source comprising transistor 29 is supplied.

Thus an audio paging signal from the page port of the PABX will modulate the 50 milliampere current supplied to transistor 39. The voltage at the collector of transistor 39 preferably should be DC 3.5, which will serve to overcome the threshold voltages of diodes 11 in the bridges of the receivers, in order to maintain them forward biased.

Capacitor 00 is connected between the collector and base of transistor 39, which has its emitter connected to ground. A positive voltage is applied to terminal 41, which terminal is connected through resistor 42 to the inverting input of operational amplifier 37, which input is also connected to ground through resistor 43 an is connected to the output of operational amplifier 37 through capacitor 44, in a conventional manner. The voltage applied to terminal 41 and the values of resistors 42 and 43 should be selected so that the inverting input of operational amplifier 37 should have about 3.5 VDC thereat, in order to provide the 3.5 VDC level at the collector of transistor 39 and thus across the pair of wires 4.

The output of inverter 28 is connected to the input of inverter 45, which has its output connected to the cathode of diode 46. The anode of diode 46 is connected to the anode of diode 47 which has its cathode connected to a +8 V. source. The junction of the two anodes is connected to the non-inverting + input of operational amplifier 37, and through resistor 48 to the collector of transistor 39.

In operation, when the page or charge control terminal 27 is low (the battery charge condition) the output of inverter 45 will be low. This will pull down the voltage at the + input of amplifier 37, effectively shutting it down. Accordingly any noise signals appearing at terminal 34 will not pass through amplifier 37, transistor 39 and will not be applied to wires 4. This of course coincides with the function described above of causing the current source comprising transistor 29 to go to high impedance, substantially reducing the current supplied to transistor 39, and with the enabling of the source 10 to supply charging voltage and current to wires 4.

On the other hand when a paging signal is to be transmitted, the external voice actuated circuit produces a control signal which causes terminal 27 to go to high level, and thus the output of inverter 45 to go high, releasing the + terminal of operational amplifier 37. Thus paging signals appearing on terminal 34 will be able to pass through amplifier 37 and transistor 39. The signal appearing on the collector of transistor 39 will be raised to a base voltage of about 3.5 volts. Since the current source comprising transistor 29 now has reverted to its conduction condition as described earlier, it will supply typically 50 milliamperes of DC to current transistor 39, which modulates the current with the paging signal about the 3.5 volt base line. Also as described earlier with the circuit comprising transistor 29 dropping to low impedance the source 10 becomes high impedance, reducing the charging voltage and current applied to lead 10 to virtually zero.

It may be seen that the circuit described above causes the application of charging current from the pair of wires 4 in the absence of a paging signal and eliminates it in the presence of a paging signal. At each receiver the presence or absence of charging current disables or enables respectively the paging amplifier, and the local rechargeable battery is thus charged or is allowed to power a paging amplifier.

A person skilled in the art understanding this invention may now conceive of various embodiments or alternatives to the design described herein. All are considered to be within the scope of the present invention as defined in the claims appended hereto.

We claim:

1. A paging system comprising:
   (a) a plurality of paging amplifiers,
   (b) a pair of wires connected to said amplifiers for carrying a paging signal to said amplifiers, the wires having narrow gauge and of insufficient capacity to carry operating power to said plurality of amplifiers,
   (c) each of said amplifiers having a local chargeable battery connected to receive charging current from the pair of wires and for operating the associated paging amplifier, and
   (d) means for applying charging power to the pair of wires for charging the batteries associated with said plurality of amplifiers during the intervals when no paging signal is being carried by the wires.

2. A system as defined in claim 1 in which the means for applying charging current includes means for eliminating the charging power during intervals when the pair of wires carries a paging signal, and means at each paging amplifier for detecting the presence or absence of charging current and/or voltage and for disabling or enabling respectively the associated amplifiers in response thereto.

3. A paging system comprising:
   (a) a remote paging signal source for providing a signal to be amplified,
   (b) a local amplifier for amplifying said signal including a chargeble battery for powering the amplifier,
   (c) means for providing battery charging current for said battery,
   (d) a pair of narrow gauge wires interconnecting the paging signal source and said battery charging current providing means with the local amplifier for alternatively carrying the signal and said current to the amplifier.

4. A system as defined in claim 3 in which the battery charging current providing means is connected to the pair of wires adjacent the paging signal source.

5. A system as defined in claim 3 in which the battery charging current providing means is connected to the pair of wires adjacent the amplifier.

6. A paging system comprising:
   (a) a remote paging signal source for providing a signal to be amplified,
   (b) a local amplifier for amplifying said signal, including a chargeable battery for powering the amplifier,
   (c) a pair of narrow gauge wires connecting the paging signal source and the amplifier, for receiving the signal and carrying the signal to the amplifier,
   (d) means for applying charging current for said battery to the pair of wires during intervals when said signal is not being provided,
   (e) means for sensing the presence or absence of said charging current and for disabling or enabling the amplifier respectively in response thereto from amplifying signals which may appear on the pair of wires and from drawing or to draw operating power from the battery, respectively.

7. A paging system comprising:
   (a) a local paging amplifier,
   (b) a local chargeable battery connected to power the amplifier,
   (c) a remote paging signal source for providing a signal to be received and amplified by the amplifier,
   (d) a pair of wires connecting the signal source and the amplifier for carrying said signal between the paging signal source and the amplifier,
   (e) battery charge current supply means for applying battery charging current to the pair of wires insufficient to power the amplifier but sufficient to charge the battery over an extended period of time, during the time that the signal is not provided by the paging signal source means.

8. A system as defined in claim 7 including means for sensing the presence or absence of charging current and for disabling or enabling the amplifier respectively in response thereto, whereby during the presence of charging current the amplifier is inhibited from amplifying any signal which may appear on the pair of wires and from drawing operating current.

9. A system as defined in claim 8, including means in the battery charge current supply means for applying charging current at a predetermined charge voltage to the pair of wires, and for reducing the charge current and voltage to about zero or near zero while a paging signal to be amplified is applied to the pair of wires.

10. A system as defined in claim 8 in which the amplifier includes an enable/disable terminal, and said disabling or enabling means for applying a predetermined fraction of the charging voltage to the enable/disable terminal whereby the amplifier is enabled or disabled.

11. A system as defined in claim 10 in which the amplifier includes a diode bridge connected to the pair of wires, a resistor voltage divider connected across the output of the bridge forming said means for applying a predetermined fraction, the junction of the resistor divider being connected to said enable/disable terminal, an AC coupled paging signal transmission path connected between the output of the diode bridge and the input of the amplifier, a speaker connected to the output of the amplifier, one terminal of the battery being connected to a power input of the amplifier and the other terminal of the battery being connected to one output terminal of the diode bridge, and said one terminal of the battery being connected via a diode to the other output terminal of the diode bridge via a DC transmission path, the diode being poled in such direction as to allow the battery to be charged when battery charge current is applied to the two wires but to prevent discharge of the battery to the pair of wires when charge current is not applied to the pair of wires.

* * * * *